No. 715,292. Patented Dec. 9, 1902.
J. W. PRIDMORE & B. R. BENJAMIN.
MACHINE FOR HARVESTING CORN.
(Application filed Feb. 27, 1896.)
(No Model.) 4 Sheets—Sheet 1.
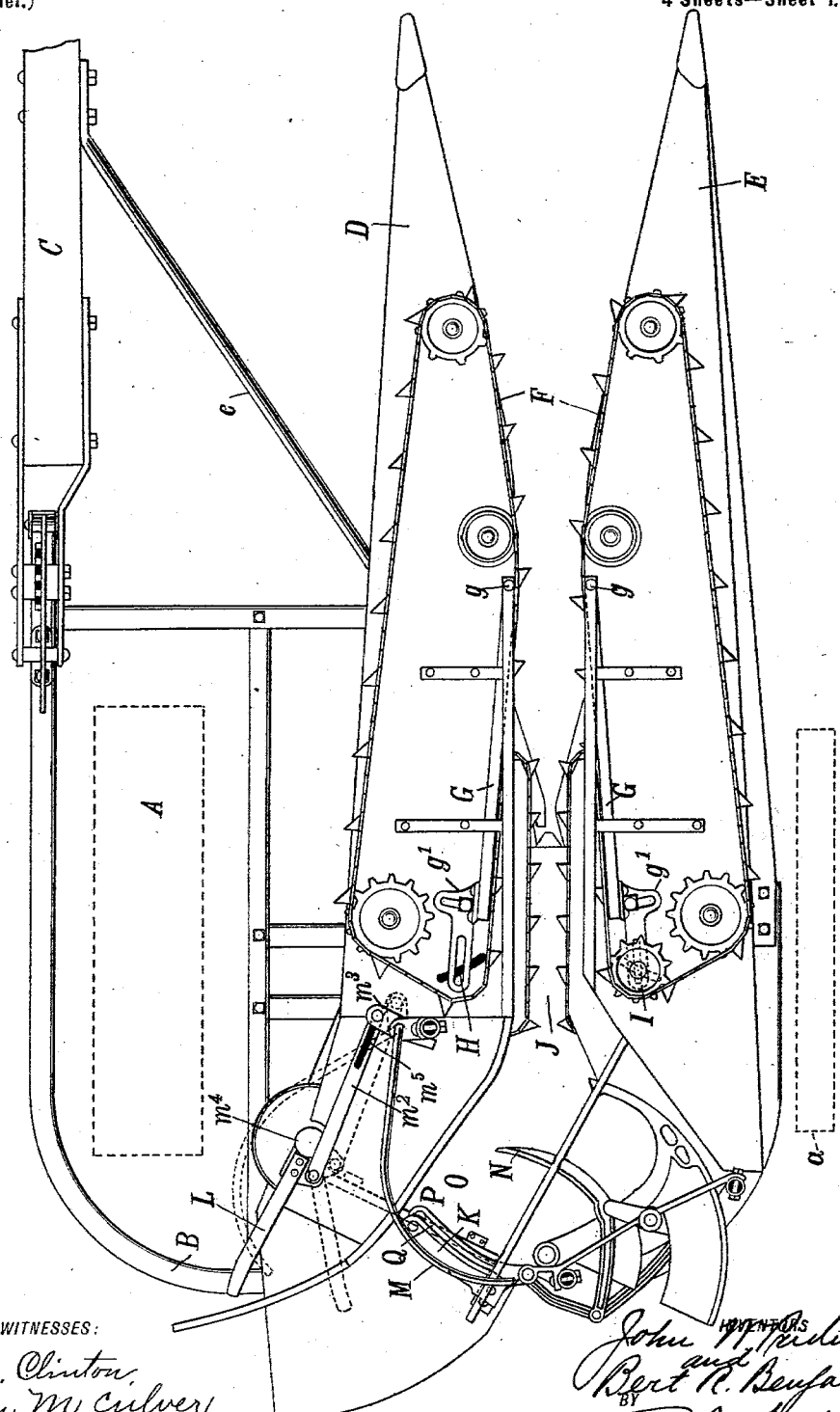

No. 715,292. Patented Dec. 9, 1902.
J. W. PRIDMORE & B. R. BENJAMIN.
MACHINE FOR HARVESTING CORN.
(Application filed Feb. 27, 1896.)
(No Model.) 4 Sheets—Sheet 2.
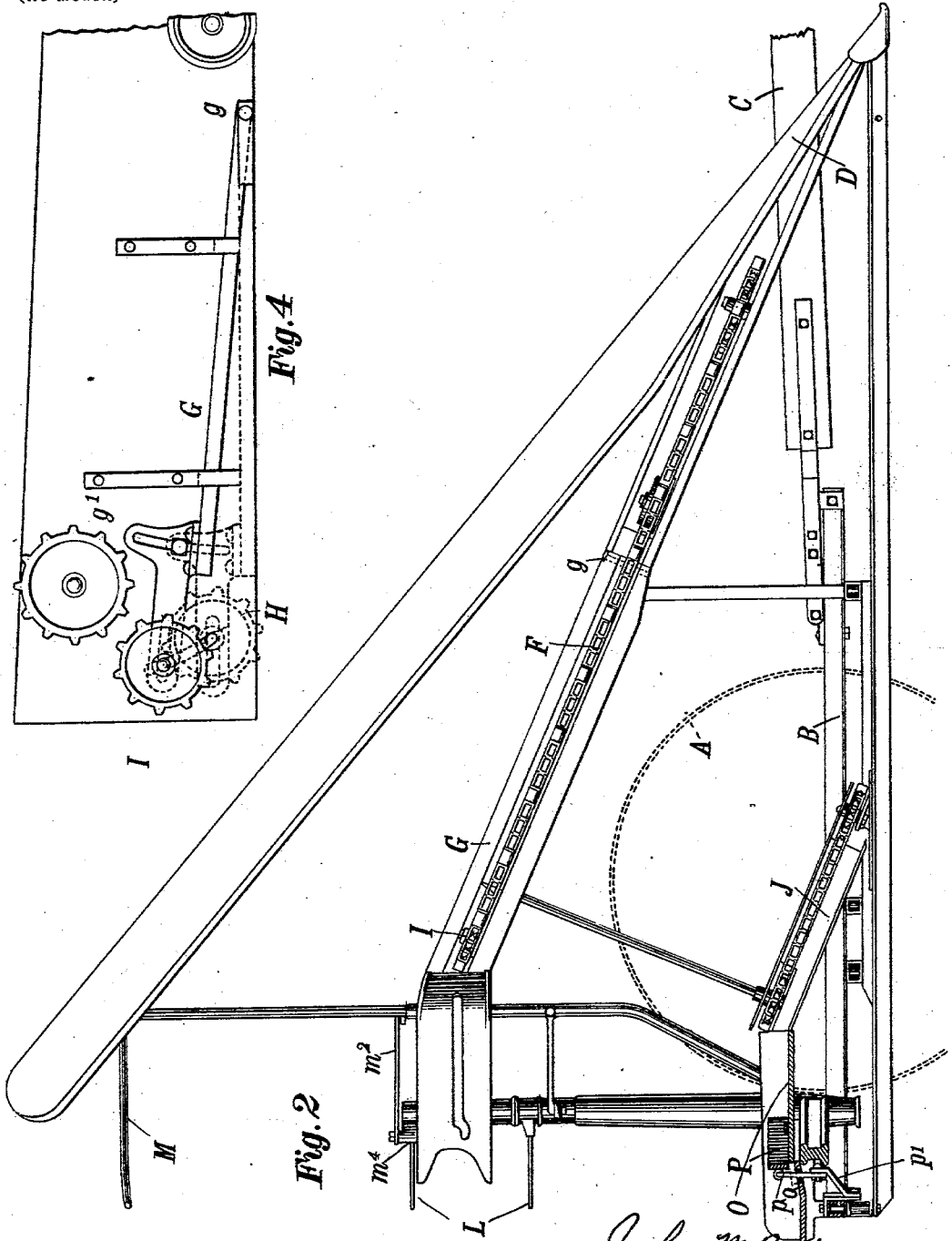

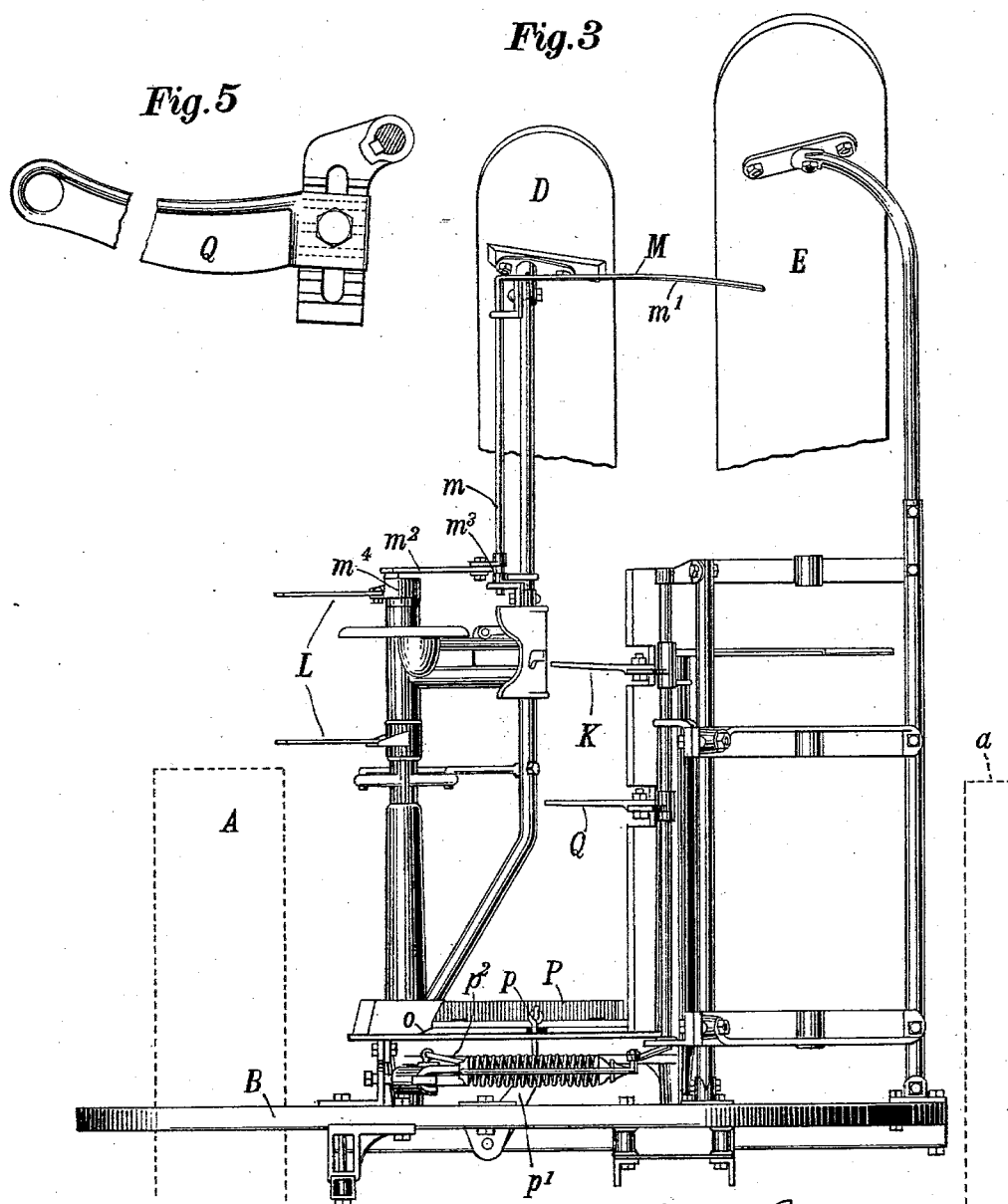

No. 715,292.　　　　　　　　　　　　　　Patented Dec. 9, 1902.
J. W. PRIDMORE & B. R. BENJAMIN.
MACHINE FOR HARVESTING CORN.
(Application filed Feb. 27, 1896.)

(No Model.)　　　　　　　　　　　　　　　　4 Sheets—Sheet 4.

WITNESSES:

UNITED STATES PATENT OFFICE.

JOHN W. PRIDMORE AND BERT R. BENJAMIN, OF CHICAGO, ILLINOIS, ASSIGNORS TO THE McCORMICK HARVESTING MACHINE COMPANY.

MACHINE FOR HARVESTING CORN.

SPECIFICATION forming part of Letters Patent No. 715,292, dated December 9, 1902.

Application filed February 27, 1896. Serial No. 581,037. (No model.)

*To all whom it may concern:*

Be it known that we, JOHN W. PRIDMORE and BERT R. BENJAMIN, of Chicago, in the county of Cook and State of Illinois, have invented certain new and useful Improvements in Machines for Harvesting Corn, of which the following is a specification.

This invention has relation more particularly to that class of corn self-binding harvesters in which the corn is delivered in a continuous stream standing on end to a vertically-positioned binding mechanism that apportions bundles from the stream and binds and ejects them to the side and rear of the machine.

The object of the invention is to improve the means of holding the corn in a vertical position after it has been cut and to keep it on end until it reaches the binder, to improve the means of starting the binding mechanism into action in the many different conditions and varieties of corn, and to improve the means of transporting the corn on end between guiding-prongs to the binder, so as to handle it as gently as possible, and to accomplish other purposes, all of which will be described in the specifications and a means of carrying out the performance illustrated in the accompanying drawings.

Figure 6:
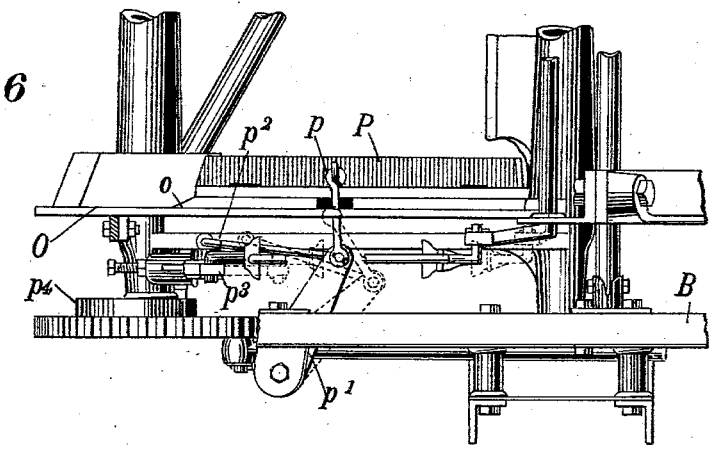
Figure 7:
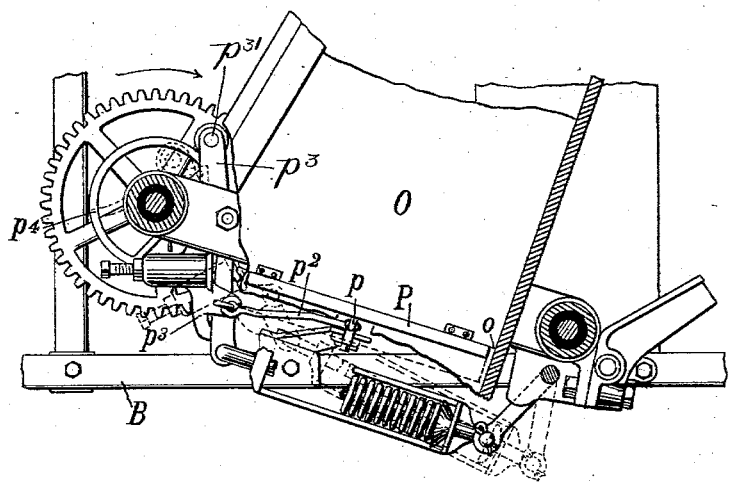

In the drawings, Figure 1 is a top plan view of a corn-harvesting machine of the Peck type, showing the construction of the parts in accordance with our invention, together with such adjacent parts as are necessary to an understanding of the invention. Fig. 2 is a side sectional view lengthwise of the machine, showing the inner gathering-prong and the forwarding devices thereon. Fig. 3 is a rear view of the machine with parts that are unnecessary to the understanding of the invention removed. Fig. 4 is an enlarged top view of the detail that allows the forwarding-chain to be adjusted at its delivery end. Fig. 5 is a view of the supplemental trip and the compressing-finger, showing its adjustability. Fig. 6 is a view in elevation of the mechanism for operating the gate that is positioned upon the floor of the binder, and Fig. 7 is a top view of the same parts with the floor and part of the spring-link broken away to more clearly show the construction.

Similar letters refer to similar parts throughout the several views.

Referring to the drawings, the main wheel A and grain-wheel *a* are represented in dotted lines in the views where they are shown. They are positioned in the main frame B of the machine and attached thereto in any of the many well-known ways of such attachments in grain-harvesting machines. The tongue C is attached to the main frame and is braced by the diagonal support *c*. Projecting forwardly from the frame of the machine are the prongs D and E. The prong D is on the side toward the main wheel. These prongs are projected forward from the main frame of the machine, so as to pass one on each side of the row of corn to be cut, and have guiding-boards that extend from their points rearwardly and upwardly to sustain the corn in an upright position. Positioned on these guiding-boards on the prongs are endless chains F, which are given motion from the forward advance of the machine, the aggressive faces of which travel rearwardly in the passage-way between the prongs and serve to lift and straighten the stalks and carry them to the rear.

In different sections of the country the corn varies greatly in the height to which it grows and in the position on the stalk from which the ear starts. It also varies greatly in the way in which it is planted. For ensilage-fodder purposes it is usually sown in rows. If it is sown too thick in the row, the stalks will not grow to large size, but there will be many of them, whereas if it is sown thinner the stalks frequently grow to great heights, it being not uncommon to find such corn twelve to fifteen feet in height. These ensilage varieties of corn seldom produce matured ears, the stalks being grown only for fodder. It is also common to plant in rows with single stalks from six to twelve inches apart, or with two stalks, and in other regions it will all be planted in rows in hills, all of which produce ears which will mature into sound corn. These stalks do not usually grow to such great heights. In the Eastern and New England States the cornstalks that grow ears are very short. Still, when the ground is highly fertilized the stalks grow very thickly upon the ground and produce large ears. Where the corn is used for ensilage and the stalks are cut very green, there is but little complaint of the knocking off of the ears from the stalks; but where the corn is allowed to stand in the field until the ears have become partly matured and where it is desired to still save the stalks for fodder any devices upon the machine that strike the ears will tend to knock the ears from the stalks and scatter them over the field.

The improvements that are the subject of this application have to do with adapting the machine to handle with greater facility the different kinds of corn.

As before remarked, the chains F are positioned upon the upwardly and rearwardly slanting boards on the guiding-prongs, extending well toward their points and returning along the sides of the guides that form the stalk passage-way, thus acting upon the stalks to force them onward toward the binder. In fields where it is desired to save the ears and where the growth of corn is heavy these forwarding devices will, if they strike the corn upon the ears, tend to knock the ears from the stalks, and especially at that time in the binding operation when the needle has closed the stalk passage-way and when the oncoming corn is carried against the back of the needle, there to remain until the bundle has been bound and discharged and the passage-way opened. At such time the corn will be compacted at the rear of the needle and the aggressive feeding-points upon the chains will strike upon the ears, tending to tear them and knock them from the stalks. Again, in corn that is sown for ensilage and that is very thick upon the ground and which when cut makes a thick continuous swath entering the machine the receptacle for the corn when the bundle is being bound—that is, the receptacle between the delivery ends of the chains and the needle—will be filled by the large amount of the oncoming stalks, and it will fill the passage-way. The aggressive teeth of the feeding-chains in such cases will tear through the stalks, greatly increasing draft, and the chains will carry the leaves from the stalks and husks from the ears with them in their onward movement around their sprockets, thus clogging the parts and stopping the machine. In places where the row is extremely heavy and the stalk of the corn very flexible it will pack behind the needle, lapping over the needle and so press upon it as to take more power to return the needle to normal position than there is in the machine, and sometimes even when the needle gets back the corn will have become so compacted in this receptacle in front of the needle that it will not start onward toward the binder, and thus be brought within reach of the packers. The machine will thus become clogged and the corn passage-way have to be cleaned out by hand before the machine can be started at great annoyance to the driver and a great waste of time. To remedy this difficulty, we have formed the faces G on the guiding-prongs toward the corn row at their rear ends, so that they can be swung upon a pivot, as shown at g, and thus allow the chain to pass back between the shielding-boards upon the prongs, the teeth of the chain being more or less out of engagement with the oncoming stream of corn. In order to allow the chains to get out of the way more freely, we have slotted the board of the gathering-prong, as shown at H, on which the rear inner sprockets I, around which the chain travels, is positioned, so that by loosening the stud of these sprockets they can be slid back from the corn passage-way. We have made this slot curved upon such an arc as will keep the chain when the sprocket is adjusted always at the same degree of tightness. The faces G of the gathering-prongs have been extended by means of the casting g', so that this casting, which is slotted at its end, passes over the stud on the sprocket-wheels I. Any adjustment, therefore, of the sprocket-wheels I moves the faces G with them and keeps the faces tangent to the perimeter of the sprocket-wheels. In practice it has been found that one of the faces can be let back into the prong more than the other, or when the ears are very heavy and the stalks of considerable degree of stiffness they can be dropped clear back, whereas in other conditions one of them may be entirely in and the other partly back. Attention is called to the fact that the rear ends of these delivery-chains extend into a plane that is practically the same as the plane in which the needle sweeps, and in practice it has been found that this is the more favorable position for them, as when the stalks are limber it is necessary to give the corn an aggressive movement at that part of its length that shall throw it within reach of the packers that are positioned upon both sides of the needle.

With corn of extreme length, to which attention has been called heretofore, and with the wind blowing from the direction in which the machine travels it has in practice been found that the corn will, as it goes up the inclined chute J from the knife to the binder, delay somewhat in its movement, while its upper part will be carried on by the aggressive forwarding devices on the prongs above, and it will enter the binding-receptacle with the tops bent back from the vertical and strike the trip and compressor-fingers K, which close the exit-way of the binder, and when the binder is tripped the needle will encircle an amount of stalks which if they stood vertical would not fill the receptacle in the binder, and the ends of the stalks nearest the needle will extend down the inclined chute J, so that when the bundle is bound and the discharge-arms L sweep around to discharge the bundle the top of the bundle will fall and its butts will be held by the oncoming corn, and the machine will shortly be filled with hanging bundles. If the bundles drag from the machine, they will be of a very straggly form. It may perhaps be well in order that the object of the improvements now to be considered shall be more apparent to state that the bundles of corn in order to be easily shocked and handled must have a square butt—that is, some of the stalks must not project beyond others. If they do and it is attempted to stand one of the tall bundles on end, it will not have a firm foundation, the projecting stalks will be forced into the ground, and if the shock of corn was allowed to stay until freezing weather in the fall, as is common on many farms, the projecting stalks will become frozen into the ground and much trouble ensue. Not only is this true, but in practical experience with the type of corn-binders that binds corn standing on end it has been demonstrated that the corn must be kept until it is bound and discharged in as near a vertical position as is possible.

In order to prevent the tall corn from falling to the rear after it has entered the binder and to furnish a rigid stop for the tops against which they may rest until the butts are brought along, we have pivoted a supplemental gate M near the rear end of one of the upper boards upon the guiding-prong D. This gate is formed of an upright shaft portion $m$ with long curved extension $m'$, that extends outwardly and across the corn passage-way in a plane above and somewhat behind the trip and compressor-fingers K. The long corn that is carried into the binder that perchance is leaning rearwardly will strike against this arm, while its butts will be forwarded into the binder by the forwarding devices, the packers N catching the corn after it leaves the forwarding devices and moving it back toward the trip. The stalk is of such stiffness as will usually prevent the breaking, and thus they will be straightened and a square-butted bundle will be formed standing on the lower floor O of the binder, which is substantially horizontal. When a sufficient number of stalks has been gathered to form a bundle, the binding mechanism will be started by the pressure of this corn, the power being transmitted through the corn to the trip by the packer and the bundle will be bound and discharged. Attention is called to the fact that the binder will not be actuated from the weight of a few stalks of corn, because the supplemental gate above will be supporting the weight of these stalks. It will only be started when sufficient stalks have been accumulated, so that the force of the packer will be transmitted through these stalks upon the trip. After the binder is started and the bundle is bound the gate will be opened by means of the link $m^2$, that is connected to a crank-arm $m^3$ on the shaft $m$, the other end of which is pivoted to the knotter-shaft $m^4$ outside of the center of that shaft. The height of the gate above the binding mechanism can be varied as desired. In the link $m^2$ a slot $m^5$ has been cut. The gate is held closed across the stalk passage-way when the binder is receiving its bundle. After the knot has been tied and the discharge-arms L, which are mounted on the knotter-shaft $m^4$, begin their movement to discharge the bundle the bundle pressing against the supplemental gate will throw the gate open and the upper end of the bundle will thus be allowed to pass by the gate. The gate will then remain open until the rotation of the knotter-shaft brings the end of the slot $m^5$ in the link $m^2$ against the stud, which connects it to the arm $m^3$ on the gate and closes it. The slot thus allows the gate to remain open and prevents it being started back into position as quickly as it would did it follow the motion of the knotter-shaft. When the needle recedes, however, and opens the binder for the reception of a new bundle, it is closed rapidly and positively by its connection with the binder-shaft. Its delay prevents its catching any of the tops of the corn that may incline forward, and thus holding them and preventing the discharge of the bundle from the machine.

While, as heretofore explained, the tops of the tall corn that are inclined in the direction from which the machine approaches will lean to the rear in the machine, as they will also if the wind blows in the direction from which the machine approaches, still, on the other hand, corn that is leaning from the machine and blown from it will have the butts of the stalks more freely slide up the inclined chute J, and when they strike the binding-floor O they will shoot back to the rear and their tops will incline forward, making it much more difficult to bring up their tops and to get the stalks into a vertical position. Especially is this true if the butts can slide too far rearward on the binding-floor. In the practical operation of corn-binders of this type no more serious difficulty than that of having the stalks fall forward has been encountered, and when they have a tendency to do so it is necessary to have all the tops-forwarding devices upon the machine acting upon the stalks as aggressively as possible, and still they must be stopped at their butts in order to give the forwarding devices on the top of the machine chance to bring the tops back into the same vertical plane as are the butts. In order to prevent the butts from sliding through the machine to the rear, we have hinged to the floor O of the binder a gate P, which during the accumulation of the bundle stands across the stalk passage-way and prevents the butts from shooting through the machine. Attention is called to the fact that in a vertical binder such stalks will press against the tripping devices similar to what they will when they incline rearwardly at the tops and the binder be actuated before sufficient stalks have been accumulated to form a bundle. The binder will thus bind, a straggling bundle be formed, and the oncoming corn will not be taken with sufficient rapidity to clear away the tops from the stalk passageway, and the machine will be clogged. The hinged gate P is raised and lowered by means of the link $p$, that connects it with the elbow-lever $p'$, that is pivoted upon the frame B of the machine. A link $p^2$ connects the other arm of this elbow-lever with the rock-lever $p^3$ of the binder, carrying a roller $p^{31}$ at its outer end. This rock-lever is actuated by the cam $p^4$, on which the roller travels, and is swung on its pivot during the operation of binding a bundle, so that the gate P will be lowered at the time that it is desired to sweep the bundle from the machine. The floor O of the binder at $o$ is dropped beneath the level of the plane of the main part of the floor, so that the gate P when it is swung down will not form any obstruction to the discharge of the bundle. It will not do to have such a gate located upon the floor of the binder and held closed by a spring, as the great weight of corn and the difficult work that it is to handle and compress bind and discharge the bundles will not permit of any moving of a gate against a spring and especially where that spring is strong enough to prevent a stiff stalk from passing through to the rear.

Another part of our invention relates to an arm Q, positioned in the path of the stream of corn and fastened to the same shaft as the trip and compressor K. In corn having heavy ears which grow at such a height that they enter almost directly into the binder upon the same plane as the needle it is seen in practical operation that when these ears are compressed very strongly between the compressor and the needle they will be torn from the stalks and great waste follow. It has also been found in practical handling of such corn that the distance about the bundle around the ears is very much greater than it is above or below the ears and that the ears with their stalks make such a mass of corn going in between the gathering-prongs into the binder that it is necessary to have the binder take very large amounts from this swath and form these amounts into bundles in order that the machine shall be capable of handling the corn at all. Under such circumstances the waist of the bundle or that part of it opposite the needle is not the proper place to measure the amount of stock for the bundle. Again, in very short corn filled with grass and weeds at the butts it has been found in practical operation that the binder will be filled before enough stalks have accumulated against the trip to start the binder into operation. To remedy these difficulties, we have attached an arm Q upon the same shaft as the trip and compressor-finger K, which arm we have made adjustable in a slot, as shown in Fig. 5. This arm is located beneath the trip and compressor-arm K and is adjustable along the slot in order to position it ahead of the trip and compressor when corn having very heavy ears is being cut, so that it may measure the quantity of stalks that should be placed in a bundle, and, again, when short and grassy corn is being cut that is full of trash and weeds that it may be positioned behind the trip and compressor K to actuate the binder when a proper quantity of material has accumulated. In ordinary corn that stands upright the trip and compressor K will do the actuating of the clutch that starts the binder into operation; but in the conditions heretofore pointed out the arm Q, adjustable in relation to the arm K, can be so arranged as to increase the effectiveness of the machine.

Having now described our invention, what we claim, and desire to secure by Letters Patent, is—

1. The combination, in a corn-harvester, of forwardly-projecting prongs that pass upon each side of the row, a knife between these prongs, forwarding devices upon the prongs, a binder positioned vertically behind the prongs and having a practically horizontal floor upon which the butts of the stalks rest while being bound, a gate hinged to the floor and extending across the passage-way, means for raising and lowering the gate, and packers operating in a higher plane than the gate, whereby the butts of the stalks that are brought against the gate will be retained until the stalks are straightened by the packers.

2. The combination, in a corn-harvester, of forwardly-projecting prongs that pass upon each side of the row, a knife between these prongs, forwarding devices upon the prongs, a binder positioned vertically behind the prongs and having a practically horizontal floor upon which the butts of the stalks rest while being bound, a gate P hinged to the floor and extending across the passage-way, a link $p$ connected to said gate at one end, a rock-arm $p^3$ pivoted below the floor and connected to the other end of the link, and a cam $p^4$ on a wheel on the knotter drive-shaft.

3. The combination, in a corn-harvester, of forwardly-projecting prongs that pass upon each side of the row, a knife between these prongs, forwarding devices upon the prongs, a binder positioned vertically behind the prongs and having a practically horizontal floor upon which the butts of the stalks rest while being bound, an incline J leading to said floor, and a gate P hinged to the floor so as to open outwardly and downwardly and extending across the passage-way, said floor having a portion $o$ in rear of the gate depressed so as to permit the gate to fold down on the floor without obstructing the outward passage of the bundle.

4. The combination, in a corn-harvester, of forwardly-projecting prongs with a passageway between them, forwarding devices mounted on the prongs, a knife located between the prongs, a binder positioned vertically at the rear of the passage-way, a gate M closing said passage-way at the top, packers acting upon the stalks about midway of the height of the passage-way, a shaft $m$, carrying the gate M and a slotted link $m^2$ connected to a crank on the shaft, the link $m^2$ being eccentrically connected to the knotter drive-shaft.

JOHN W. PRIDMORE.
BERT R. BENJAMIN.

Witnesses:
  HENRY B. UTLEY,
  JNO. L. SMITH.